United States Patent
Nagata et al.

(10) Patent No.: US 9,306,679 B2
(45) Date of Patent: Apr. 5, 2016

(54) RADIO RELAY STATION, RADIO BASE STATION AND RADIO COMMUNICATION METHOD WITH CHANNEL QUALITY MEASUREMENT

(75) Inventors: Satoshi Nagata, Tokyo (JP); Hidekazu Taoka, Tokyo (JP); Katsutoshi Kusume, Tokyo (JP); Petra Weitkemper, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 205 days.

(21) Appl. No.: 13/992,825

(22) PCT Filed: Dec. 9, 2011

(86) PCT No.: PCT/JP2011/078578
§ 371 (c)(1),
(2), (4) Date: Jun. 10, 2013

(87) PCT Pub. No.: WO2012/077790
PCT Pub. Date: Jun. 14, 2012

(65) Prior Publication Data
US 2013/0279364 A1    Oct. 24, 2013

(30) Foreign Application Priority Data
Dec. 10, 2010    (JP) ................. 2010-275630

(51) Int. Cl.
| | | |
|---|---|---|
| *H04W 84/04* | (2009.01) | |
| *H04B 17/02* | (2006.01) | |
| *H04B 7/155* | (2006.01) | |
| *H04W 24/10* | (2009.01) | |
| *H04B 17/40* | (2015.01) | |
| *H04W 72/04* | (2009.01) | |

(52) U.S. Cl.
CPC ............... *H04B 17/02* (2013.01); *H04B 7/155* (2013.01); *H04B 17/40* (2015.01); *H04W 24/10* (2013.01); *H04W 72/04* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 2009/0238165 A1* | 9/2009 | Cai et al. ......................... | 370/345 |
| 2010/0097978 A1* | 4/2010 | Palanki et al. ................... | 370/315 |
| 2010/0296462 A1* | 11/2010 | Taoka ............................ | 370/329 |

(Continued)

FOREIGN PATENT DOCUMENTS

WO    2010/150417 A1    12/2010

OTHER PUBLICATIONS

Japanese Office Action issued in Japanese Patent Application No. 2010-275630, mailing date Oct. 15, 2013, with English translation thereof (5 pages).
International Search Report issued in PCT/JP2011/078578 mailed on Jan. 17, 2012 (1 page).
Hitachi, Ltd.; "Modification of Type II relay for measuring RN-UE channel"; 3GPP TSG RAN WG1 #58, R1-093588; Shenzhen, China; Aug. 24-28, 2009 (3 pages).

(Continued)

*Primary Examiner* — Fang Ng
(74) *Attorney, Agent, or Firm* — Osha Liang LLP

(57) ABSTRACT

In a radio relay station, the channel quality of relay links is measured with the use of sounding reference signals from mobile terminals. Feedback information including the measurement results of the channel quality of the relay links is transmitted to a radio base station via a backhaul link. In the radio base station, the channel quality of the direct links is measured with the use of sounding reference signals from the mobile terminals. A correction value from the measurement results of the channel quality from the radio relay station is subtracted. Radio resources are allocated to a mobile terminal based on the measurement results of the channel quality of the direct links and the subtraction results.

21 Claims, 6 Drawing Sheets

(56) References Cited

U.S. PATENT DOCUMENTS

| | | | |
|---|---|---|---|
| 2011/0081903 A1* | 4/2011 | Cai et al. ................... | 455/424 |
| 2012/0051468 A1* | 3/2012 | Weitkemper .......... | H04L 1/0055 375/340 |
| 2012/0127888 A1 | 5/2012 | Fujishima et al. | |
| 2012/0134317 A1* | 5/2012 | Weitkemper .......... | H04L 1/0026 370/315 |
| 2013/0273838 A1* | 10/2013 | Nagata .................. | H04B 7/155 455/9 |
| 2013/0279364 A1* | 10/2013 | Nagata .................. | H04B 7/155 370/252 |
| 2014/0016586 A1* | 1/2014 | Khan ..................... | H04L 1/003 370/329 |

OTHER PUBLICATIONS

Alcatel-Lucent, CHTTL; "System Design Frameworks to Support Type II Relay Operation in LTE-A"; 3GPP TSG RAN WG1 #57, R1-092157; San Francisco, CA; May 4-8, 2009 (11 pages).

3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced); (Release 9)"; Mar. 2010 (34 pages).

3GPP TS 36.216 V10.0.0; "3rd Generation Partnership Project; Technical Specification Group Radio Access Network; Evolved Universal Terrestrial Radio Access (E-UTRA); Physical layer for relaying operation; (Release 10)"; Sep. 2010 (12 pages).

* cited by examiner

| RELAY LINK | CQI$_{RN}$ |
|---|---|
| UE#1 | 9 → 6 |
| UE#2 | 3 → 0 |
| UE#3 | 17 → 14 |

| DIRECT LINK | CQI$_{DeNB}$ |
|---|---|
| UE#1 | 7 |
| UE#2 | 15 |
| UE#3 | 5 |

FIG. 5

| RELAY LINK | CQI$_{RN}$ | PMI$_{RN}$ |
|---|---|---|
| UE#1 | 9 → 6 | 0 |
| UE#2 | 3 → 0 | 3 |
| UE#3 | 17 → 14 | 1 |

| DIRECT LINK | CQI$_{DeNB}$ | PMI$_{DeNB}$ |
|---|---|---|
| UE#1 | 7 | 2 |
| UE#2 | 15 | 1 |
| UE#3 | 5 | 3 |

FIG. 6

RADIO RELAY STATION, RADIO BASE STATION AND RADIO COMMUNICATION METHOD WITH CHANNEL QUALITY MEASUREMENT

TECHNICAL FIELD

The present invention relates to a radio relay station apparatus, a radio base station apparatus and a radio communication method for relay transmission.

BACKGROUND ART

In 3GPP (3rd Generation Partnership Project), standardization of LTE-Advanced (LTE (Long Term Evolution)-A) has been fostered as the 4th generation mobile communication system to realize further higher-speed and larger-capacity communications than LTE which is development standard in the 3rd generation mobile communication system. LTE-A has important issues to improve throughputs of cell-edge users as well as to realize higher-speed and larger-capacity communications, and as a way of this, study has been made of a relay transmission technique for relaying radio communications between a radio base station apparatus and a mobile terminal apparatus. With use of this relay transmission technique, it is expected to extend the coverage effectively in such a place that wired backhaul link is difficult to establish.

In the relay technique, there are type I relay (L3 relay) and type II relay (Advanced-L1 relay, Advanced-L2 relay). Type I relay is such a relay technique that a cell of a radio relay station apparatus (relay node: RN) has its own cell ID and the radio relay station apparatus transmits common/shared control signals for the own cell. Accordingly, the relay node acts as a radio base station apparatus for a mobile terminal apparatus (user terminal: UE). And, the relay node has a specific scheduler. Accordingly, type I relay makes a contribution to extension of a coverage via a radio backhaul link between the radio base station apparatus (Donor eNode B: DeNB) and the relay node RN. This type I relay has been standardized in LTE Release-10 (see Non Patent Literatures 1, 2).

On the other hand, type II relay is such a relay technique that a cell of the relay node does not have its own cell ID and the relay node does not transmit cell-specific reference signals or control signals. In type II relay, DeNB allocates its own resources and allocates resources of the relay node (scheduling). Accordingly, type II relay makes a contribution to improvement of user throughput thereby to increase the capacity. This type II relay is expected to be standardized in Release-11 LTE or later. Note that L1 relay is a relay technique called booster or repeater, which is an AF (Amplifier and Forward) type relay technique in which downlink reception RF signals from a radio base station apparatus DeNB are power-amplified and transmitted to a mobile terminal UE. And, L2 relay is a DF (Decode and Forward) type relay technique in which downlink reception RF signals from the radio base station apparatus DeNB are demodulated and decoded, then, coded and modulated again and transmitted to the mobile terminal UE.

CITATION LIST

Non-Patent Literature

Non-Patent Literature 1: 3GPP, TS36.216 (V10.0.0)
Non-Patent Literature 2: 3GPP, TS36.806 (V9.0.0)

SUMMARY OF THE INVENTION

Technical Problem

In type II relay, as the radio base station apparatus DeNB and the relay node RN use the same frequency, it is possible to control interference relatively easily as compared with type I relay. Therefore, in type II relay, it is expected to further improve user throughput thereby to increase the capacity by coordination between the radio base station apparatus DeNB and the relay node RN.

The present invention was carried out in view of the foregoing and aims to provide a radio relay station apparatus, a radio base station apparatus and a radio communication method capable of improving the user throughput thereby to increase the capacity in type II relay.

Solution to Problem

The present invention provides a radio relay station apparatus comprising: a receiving section configured to receive a sounding reference signal from a mobile terminal apparatus; a channel quality measuring section configured to measure channel quality of a relay link with use of the sounding reference signal; and a transmitting section configured to transmit feedback information including a measurement result of the channel quality of the relay link to a radio base station apparatus via a backhaul link.

Further, the present invention provides a radio base station apparatus comprising: a receiving section configured to receive sounding reference signals from mobile terminal apparatuses and to receive feedback information including measurement results of channel quality of relay links from a radio relay station apparatus; a channel quality measuring section configured to measure channel quality of direct links with use of the sounding reference signals; a subtracting section configured to subtract a correction value from each of the measurement results; and an allocating section configured to allocate radio resources to a mobile terminal apparatus based on measurement results of the channel quality of the direct links and subtraction results.

Furthermore, the present invention provides a radio communication method comprising the steps of: in a radio relay station apparatus, measuring channel quality of relay links with use of sounding reference signals from mobile terminal apparatuses; and transmitting feedback information including measurement results of the channel quality of the relay links, to a radio base station apparatus via a backhaul link; and in the radio base station apparatus, measuring channel quality of direct links with use of sounding reference signals from the mobile terminal apparatuses; subtracting a correction value from the measurement results of the channel quality from the radio relay station apparatus; and allocating radio resources to mobile terminal apparatus based on measurement results of the channel quality of the direct links and subtraction results.

Technical Advantageous of the Invention

According to the present invention, in type II relay, the radio base station apparatus allocates radio resources to communication that uses more radio resources in such a manner that channel quality is corrected to be decreased in accordance with an amount of extra use of the radio resources. With this structure, allocation of radio resources is performed in consideration of usage of radio resources, and therefore, it is possible to make effective control of interference and improve user throughput thereby increasing the capacity.

BRIEF DESCRIPTION OF THE DRAWINGS

FIG. 5 is a diagram for explaining feedback information in the radio communication method according to an embodiment of the present invention;

FIG. 6 is a diagram for explaining feedback information in the radio communication method according to an embodiment of the present invention;

DESCRIPTION OF EMBODIMENTS

With reference to the accompanying drawings, embodiments of the present invention will be described in detail below.

As described above, in order to improve user throughput thereby to increase the capacity in type II relay, of importance is coordination between the radio base station apparatus DeNB and the relay node RN. The present inventors have noted CoMP (Coordinated Multi-Point transmission and reception) in considering coordination between the radio base station apparatus DeNB and the relay node RN.

Figure 1:
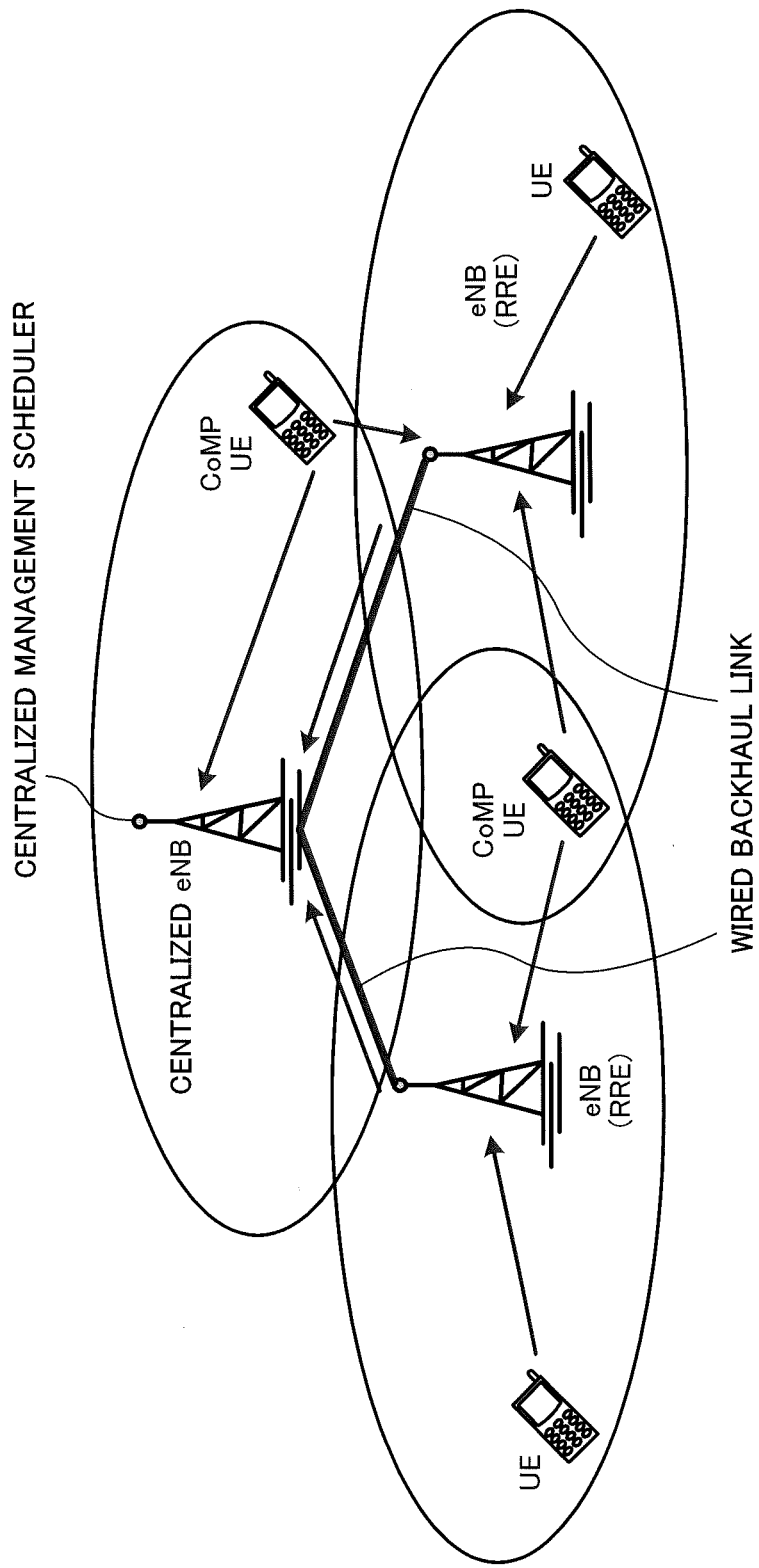
FIG. 1 is a diagram for explaining uplink CoMP reception.

FIG. 1 is a diagram for explaining uplink CoMP reception. In FIG. 1, illustrated is a configuration of a remote base station (RRE: Remote Radio Equipment). In RRE configuration, a centralized eNB for performing baseband signal processing of a plurality of RRE and controlling them and each cell, that is, RRE are connected by an optical fiber (wired backhaul link). The centralized eNB has a centralized management scheduler to make centralized control of radio resources.

In such a structure, channel state information (CSI) and channel quality (CQI: Channel Quality Indicator) of all UE apparatuses are transmitted to the centralized eNB via wired backhaul links. In the centralized eNB, these CSI and CQI are used to make control of the radio resources, thereby to realize uplink CoMP reception of signals from cell-edge UE apparatuses (CoMP UE). In this way, in uplink CoMP, the centralized eNB and RRE apparatuses coordinate with each other by transmitting and receiving various information pieces with use of wired backhaul links.

Figure 2:
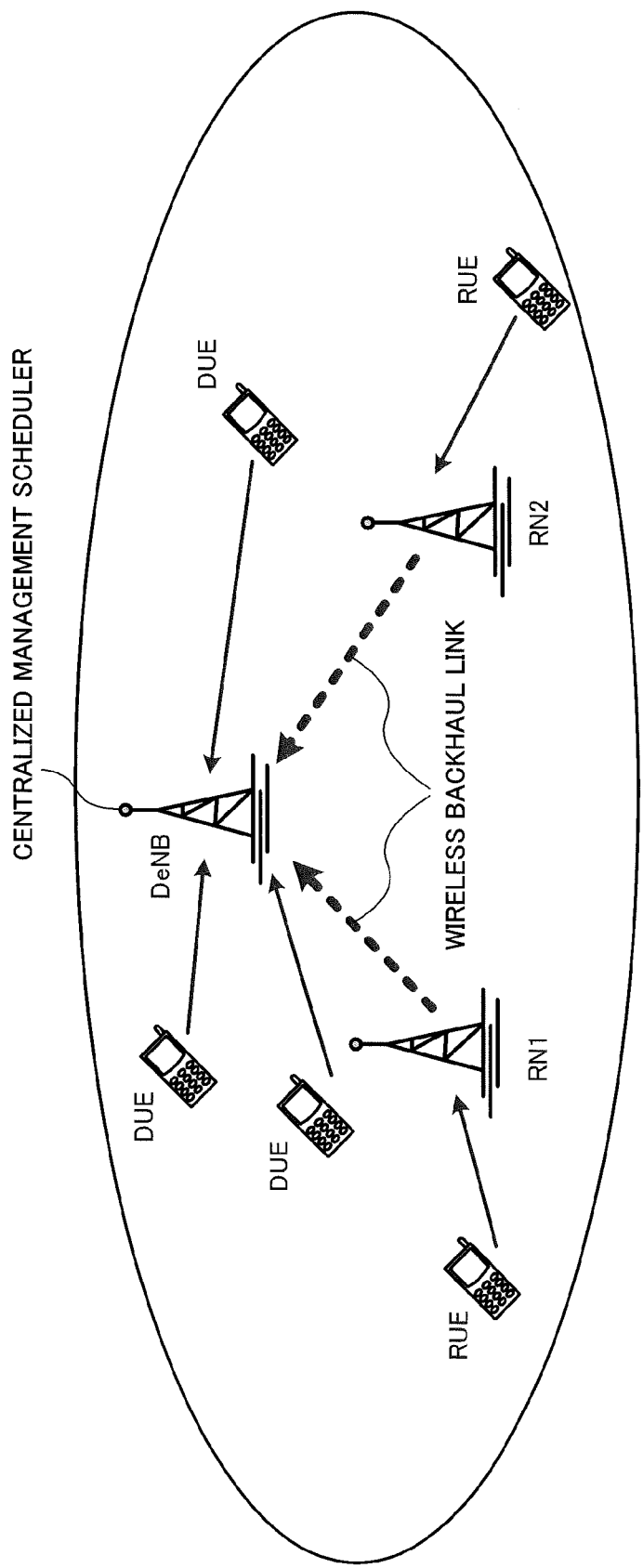
FIG. 2 is a diagram for explaining a radio communication system using type II relay.

FIG. 2 is a diagram for explaining a radio communication system using type II relay. In the radio communication system illustrated in FIG. 2, relay nodes RN1 and RN2 are provided in a cell formed by the radio base station apparatus DeNB. The relay nodes RN1 and RN2 transmit, to the radio base station apparatus DeNB, CSI and CQIs of mobile terminals RUE (Relay UE) (hereinafter referred to as "relay terminal RUE") connected to the relay nodes via radio backhaul links (broken lines). The relay nodes RN1 and RN2 receive signals for relay terminals RUE from the radio base station apparatus DeNB. And, the relay nodes RN1 and RN2 transmit and receive signals for the relay terminals RUE via the respective access links. The radio base station apparatus DeNB transmits and receives signals to and from a mobile terminal DUE (Donor User Equipment, hereinafter referred to as "donor terminal DUE") that is connected to the radio base station apparatus.

In the radio communication system illustrated in FIG. 2, the radio base station apparatus DeNB has a centralized management scheduler and makes centralized control of radio resources of the relay nodes RN1 and RN2 and the radio base station apparatus DeNB. In this way, also in the radio communication system illustrated in FIG. 2, it is possible to make coordination between the radio base station apparatus DeNB and each relay node RN. However, in this radio communication system, the amount of used radio resources varies from transmission/reception via a direct link between the donor terminal DUE and the radio base station apparatus DeNB to transmission/reception between a relay terminal RUE and the radio base station apparatus DeNB. That is, transmission and reception between the relay terminal RUE and the radio base station apparatus DeNB uses, as radio resources, a relay link between the relay terminal RUE and the relay node RN and a backhaul link between the relay node RN and the radio base station apparatus DeNB, which requires more radio resources than transmission and reception between the radio base station apparatus DeNB and the donor terminal DUE using radio resources only of the direct link between the donor terminal DUE and the radio base station apparatus DeNB.

Accordingly, in order to realize improvement of throughput and increase in capacity by controlling interference efficiently, it is necessary to consider coordination between the radio base station apparatus DeNB and the relay node RN in view of usage of radio resources by both of communication using a relay link and communication using a direct link. In this regard, coordination between the radio base station apparatus DeNB and the relay node RN is different from uplink CoMP where a centralized eNB and a RRH coordinate with use of a wired backhaul link. Here, the radio resources are resources for radio communications and include time, frequency, space, code and so on.

Noting this point, the present inventors have found that allocation of radio resources to communication that use more radio resources is suppressed by decreasing channel quality in accordance with an amount of extra use of the radio resources, thereby to make effective control of interference, realizing improvement of user throughput and increase in capacity, and finally completed the present invention. That is, in type II relay, the radio base station apparatus DeNB allocates radio resources to communication that uses more radio resources in such a manner that channel quality is corrected to be decreased in accordance with an amount of extra use of the radio resources. With this structure, allocation of radio resources is performed in consideration of usage of the radio resources, and consequently, it is possible to control interference efficiently thereby to improve user throughput and increase capacity.

Figure 3:
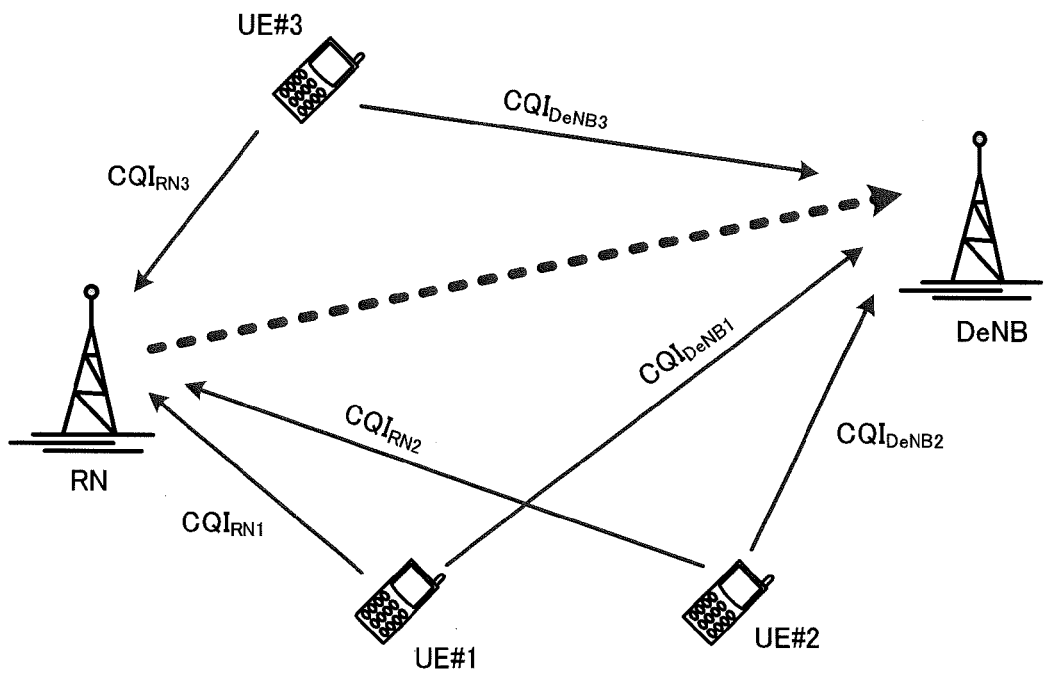
FIG. 3 is a diagram for explaining a radio communication method according to an embodiment of the present invention.

FIG. 3 is a diagram for explaining a radio communication method according to an embodiment of the present invention.

In the radio communication system illustrated in FIG. 3, a relay node RN is installed in a cell of a radio base station apparatus DeNB and three user terminals UE exist within the cell. The radio base station apparatus DeNB allocates specific resource blocks (RBs) (radio resources) to any of the user terminals UE.

First, the user terminals UE#1 to UE#3 transmit reference signals (SRSs: Sounding Reference Signals) to the radio base station apparatus DeNB and the relay node RN. The radio base station apparatus DeNB and the relay node RN receive the SRSs from the user terminals UE#1 to UE#3 and measure CQIs as channel quality of the user terminals UE#1 to UE#3 with use of the respective SRSs.

The radio base station apparatus DeNB measures and stores CQIs ($CQI_{DeNB1}$ to $CQI_{DeNB3}$) of the direct links of the user terminals UE#1 to UE#3 with use of the received SRSs (see the lower table in FIG. 5). On the other hand, the relay node RN measures CQIs ($CQI_{RN1}$ to $CQI_{RN3}$) of the relay links of the user terminals UE#1 to UE#3. Here, the radio base station apparatus DeNB cannot know the CQIs ($CQI_{RN1}$ to $CQI_{RN3}$) of the relay links. Therefore, the relay node RN transmits the CQIs ($CQI_{RN1}$ to $CQI_{RN3}$) of the relay links to the radio base station apparatus DeNB via the radio backhaul link. With this transmission, the radio base station apparatus DeNB also stores the CQIs ($CQI_{RN1}$ to $CQI_{RN3}$) of the relay links (see the upper table in FIG. 5).

The radio base station apparatus DeNB allocates radio resources (RBs) to any of the user terminals UE with use of the CQIs of the direct links of the user terminals UE#1 to UE#3 and the CQIs of the relay links of the user terminals UE#1 to UE#3. If allocating the radio resources (RBSs) to any of the user terminals UE based on the table in FIG. 5, the radio resources are to be allocated to the user #3 (relay link) of best channel quality (highest CQI value: 17). However, as communication of the user #3 via the relay link is communication using more radio resources, allocation of the radio resources is performed with the channel quality corrected to be decreased in accordance with the amount of extra use of the radio resources. Here, as an example, the channel quality (CQI) for transmission via the relay link is corrected with a fixed correction value XdB=3 dB (the correction value (offset value) is subtracted from the CQI value transmitted from the relay node RN).

As seen in the upper table in FIG. 5, by subtracting the correction value from the CQI values transmitted from the relay node RN, the CQI values of the relay links of the user terminals UE#1 to UE#3 become (9→6) for UE#1, (3→0) for UE#2 and (17→44) for UE#3. In this way, if the radio resources (RBs) are allocated to any of the user terminals UE in consideration of the amount of extra use of the radio resources, or, in other words, if the radio resources (RBs) are allocated to any of the user terminals UE with reference to the table defining corrected CQI values, the radio resources are to be allocated to the user #2 (direct link) of best channel quality (higher CQI value: 15).

Figure 4:
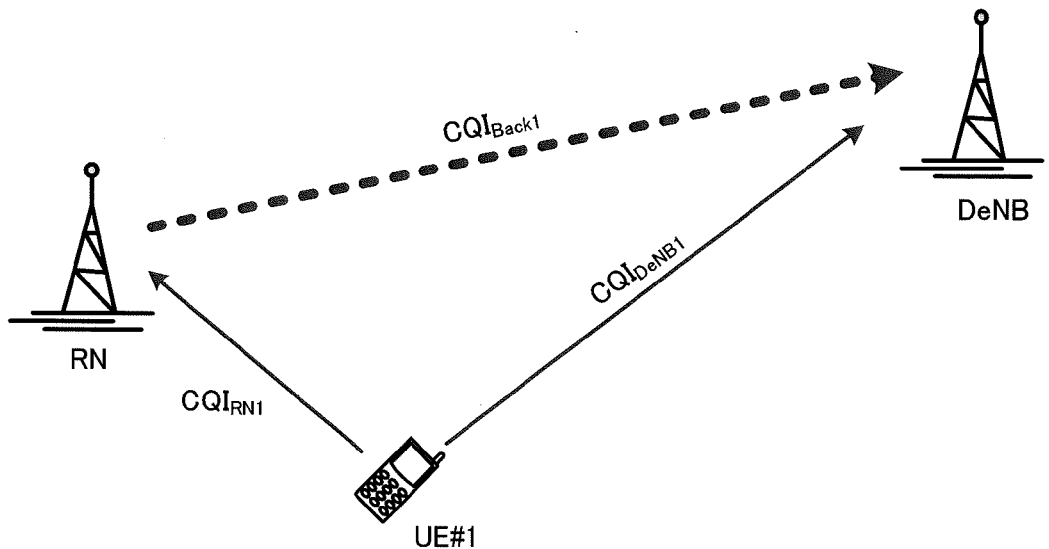
FIG. 4 is a diagram for explaining a radio communication method according to an embodiment of the present invention.

In FIG. 5, it is assumed that XdB=3 dB as an example. However, the value of X may be different values among users or values that vary with time in accordance with the channel quality (CQI). Here, description is made about an example of a method for determining a correction value X. The technique used here is DF (Decode and Forward) type relay technique. In FIG. 4, $CQI_{RN1}$ is a CQI that is measured at the relay node RN with use of a SRS from the UE#1, and $CQI_{DeNB1}$ is a CQI that is measured at the radio base station apparatus DeNB with use of a SRS from the UE#1. And, $CQI_{Back1}$ means that the $CQI_{RN1}$ measured at the relay node RN is transmitted via the radio backhaul link.

Here are the following formulas:

$CQI_{RN1}$=SINR(UE→RN)(dB)

$CQI_{Back1}$=SINR(RN→DeNB)(dB)

In this case, the correction value X (dB) is preferably a value that varies among mobile terminal apparatus, using any parameter out of a channel quality measurement result of the access link, a channel quality measurement result of the backhaul link or any relay-type. And, the correction value X (dB) may be determined in the following manner. Note that this method for determining the correction value is not limiting and any other method may be employed as far as the correction value is determined in accordance with an amount of extra use of the radio resources.

When a YHz band is allocated in the access link, $Z=Y \log_2 (1+10^{\wedge}(CQI_{RN1}/10))$ bits can be transmitted by the Shannon capacity theoretical formula. When the same Z bits are transmitted in the backhaul link, $Y'=Y \log_2 (1+10^{\wedge}(CQI_{RN1}/10)/\log_2 (1+10^{\wedge}(CQI_{Back1}/10))$ Hz are required. In other words, as the relay link uses the frequency resources of $Y+Y'=Y (1+\log_2 (1+10^{\wedge}(CQI_{RN1}/10)/\log_2 (1+10^{\wedge}(CQI_{Back1}/10))$ Hz, the resources are consumed by a factor of $1+\log_2 (1+10^{\wedge}(CQI_{RN1}/10))/\log_2 (1+10^{\wedge}(CQI_{Back1}/10))$ Hz as the radio resources of the extra use of the radio backhaul link. This is converted to dB, which is shown in the following formula (1).

$$X(\text{dB}) = 10 \log_{10}\left\{1 + \frac{\log_2\left(1 + 10^{CQI_{RN_1}/10}\right)}{\log_2\left(1 + 10^{CQI_{Back_1}/10}\right)}\right\} \quad \text{(FORMULA 1)}$$

Thus, according to the radio communication method of the present invention, information of channel quality of an access link between the relay node RN and the relay terminal UE and, if necessary, relay function information (relay type information such as AF or DF) are transmitted from the relay node RN to the radio base station apparatus DeNB by the radio backhaul link. Then, in the radio base station apparatus DeNB, a value of the channel quality of the access link is corrected in consideration of usage of the radio resources and then, the radio resources are allocated to any user terminal. In this case, the radio resources are allocated to a user terminal of best channel quality among user terminals of the relay link and the direct link.

The node (radio base station apparatus DeNB or the relay node RN) of the user terminal UE thus allocated with the radio resources (the radio base station apparatus DeNB in FIG. 5) is used as a basis to determine a modulation and coding scheme (MCS) for adaptive modulation and coding (AMC). In this case, as the modulation and coding scheme is determined while the radio resources are allocated properly in consideration of usage of the radio resources, it is possible to improve the user throughput effectively and increase the capacity efficiently.

Further, when a user terminal has a precoding function of MIMO (Multiple-Input Multiple-Output), the node (the radio base station apparatus DeNB or the relay node RN) of the user terminal UE thus allocated with the radio resources (the radio base station apparatus DeNB in FIG. 5) is used as a basis to select a precoding beam. In this case, as the precoding beam is selected while the radio resources are properly allocated in consideration of usage of the radio resources, it is possible to improve the user throughput effectively and increase the capacity efficiently.

In this case, the user terminals UE#1 to UE#3 receive respective reference signals included in downlink control signals from the radio base station apparatus DeNB or the relay node RN. The user terminals UE#1 to UE#3 perform channel estimation with use of the reference signals and determine PMIs (Precoding Matrix Indicators) based on the channel estimation results. The radio base station apparatus DeNB determines PMIs for the direct links and stores them (see the lower table in FIG. 6). The radio base station apparatus DeNB cannot know PMIs of the relay links. Therefore, the relay node RN transmits the PMIs for the relay links to the radio base station apparatus DeNB via the radio backhaul link. With this structure, the radio base station apparatus DeNB also stores the PMIs of the relay links (see the upper table in FIG. 6).

As the radio base station apparatus DeNB thus stores PMIs as well as CQIs of the relay links, when radio resources are allocated to any user terminal UE by the above-mentioned method, the radio base station apparatus DeNB performs beam forming with use of the PMI associated with the user terminal (direct link or relay link).

Figure 7:
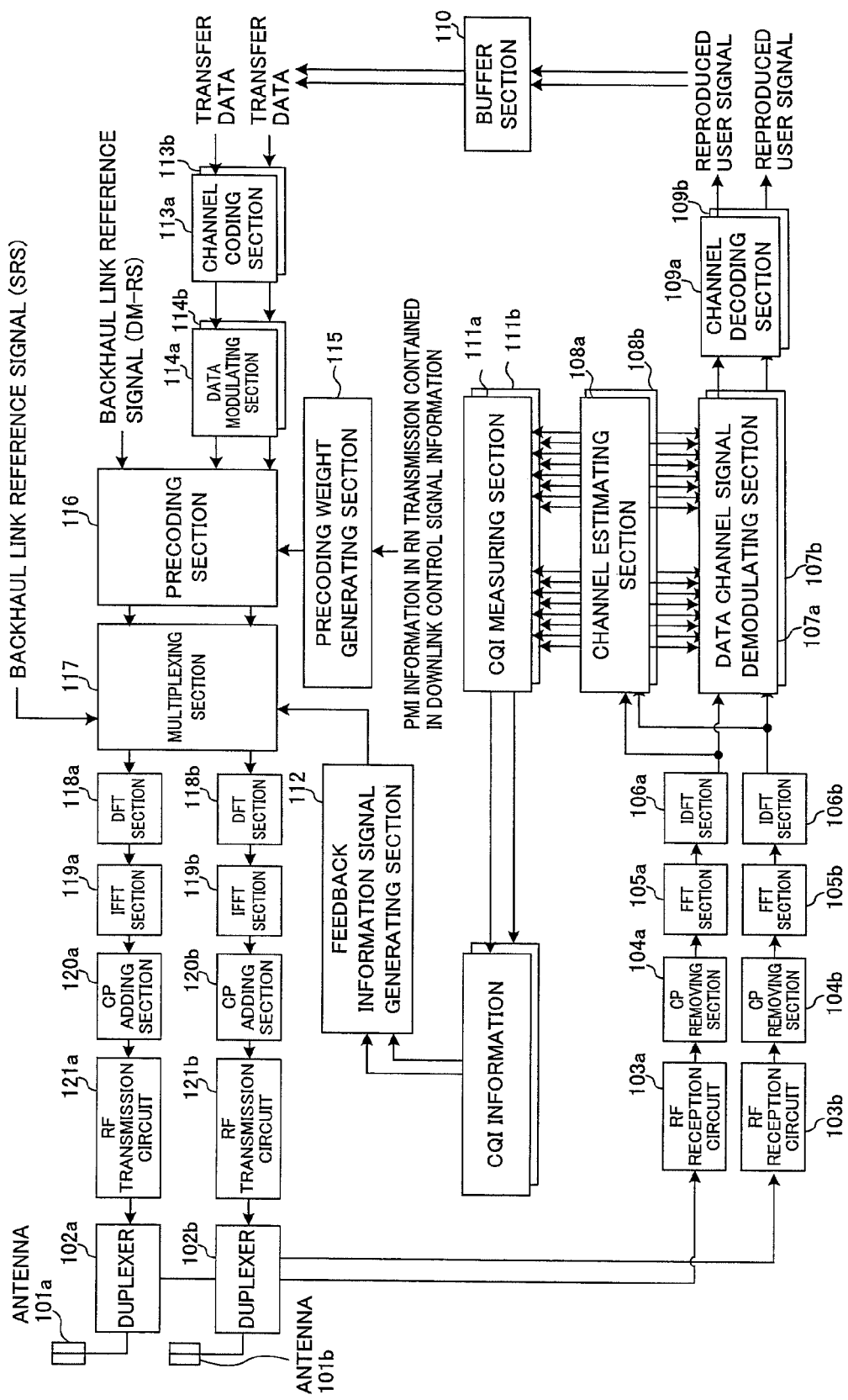
FIG. 7 is a block diagram for illustrating a configuration of a radio relay station apparatus according to the present embodiment.

FIG. 7 is a block diagram illustrating a configuration of a radio relay station apparatus (DF type relay node) RN according to the present embodiment. Here, illustration in FIG. 7 is simplified for explanation and an uplink receiving section and a transmitting (transferring) section are only illustrated. However, needless to say, the radio relay station apparatus is configured to have standard parts.

In the relay node RN illustrated in FIG. 7, transmission signals transmitted from the user terminals UE#1 to UE#3 are received by antennas 101a and 101b, electrically separated into transmission paths and reception paths by duplexers 102a and 102b, and output to RF reception circuits 103a and 103b. Then, in the RF reception circuits 103a and 103b, the signals are subjected to frequency conversion processing and converted from radio frequency signals to baseband signals, and then, output to CP removing sections 104a and 104b. Here, the antennas 101a and 101b, the duplexers 102a and 102b, and the RF reception circuits 103a and 103b make up a receiving section for receiving SRSs from the user terminals.

The CP removing sections 104a and 104b remove CPs (Cyclic Prefixes) from the frequency-converted signals, and the CP-removed signals are output to FFT (fast Fourier transform) sections 105a and 105b. The FFT sections 105a and 105b perform Fourier transform on the CP-removed signals, which are converted from time-series signals into frequency-domain signals. The converted signals are output to IDFT (inverse discrete Fourier transform) sections 106a and 106b. The IDFT sections 106a and 106b preform inverse discrete Fourier transform on the converted frequency-domain signals, which signals are converted from the frequency-domain signals to time-series signals. The converted signals are output to channel estimating sections 108a and 108b and data channel signal demodulating sections 107a and 107b.

The channel estimating sections 108a and 108b estimate channels states based on DM-RSs (Demodulation Reference Signals) and SRSs included in reception signals output from the IDFT sections 106 and 106b. The channel states estimated based on the DM-RSs are transmitted to the data channel signal demodulating sections 107a and 107b. The data channel signal demodulating sections 107a and 107b demodulate data channel signals based on the transmitted channel states. The demodulated data channel signals are channel-decoded in channel decoding sections 109a and 109b and reproduced into user signals. The reproduced user signals are output to a buffer section 110 and stored there until a request for transfer is received from the radio base station apparatus DeNB.

CQI measuring sections 111a and 111b measure channel quality (CQIs) with use of the channel states estimated with the SRSs from the user terminals by the channel estimating sections 108a and 108b. The CQI measuring sections 111a and 111b measure CQIs ($CQI_{RN1}$ to $CQI_{RN3}$) with use of the SRSs from the user terminals (UE#1 to UE#3 in FIG. 3) in the cell. The CQI measuring sections 111a and 111b output these CQI measurement results (CQI information) to a feedback information signal generating sections 112.

A precoding weight generating section 115 generates precoding weights using RMI information in relay node transmission included in downlink control information communicated from the radio base station apparatus DeNB. The precoding weight generating section 115 outputs the generated precoding weights to a precoding section 116.

The precoding section 116 performs phase shift and/or amplitude shift on the transmission data, for each of the antennas 101a and 101b, based on the precoding weights associated with the PMI information. The transmission data phase-shifted and/or amplitude-shifted by the precoding section 116 is output to a multiplexing section 117. The precoding section 116 multiplexes the transmission data before precoding with a backhaul link reference signal. This backhaul link reference signal is a reference signal used for demodulation at the radio base station apparatus DeNB and is the same as DM-RS (Demodulation Reference Signal).

Here, the transmission data is user signals (transfer data) accumulated in the buffer section 110. The transfer data is channel-coded by channel coding sections 113a and 113b and output to data modulating sections 114a and 114b. The data modulating sections 114a and 114b data-modulate the channel-coded transfer data. The data modulating sections 114a and 114b output the data-modulated transfer data to the precoding section 116.

The feedback information signal generating section 112 generates feedback information signals using, as feedback information, CQIs ($CQI_{RN1}$ to $CQI_{RN3}$) of the user terminals (UE#1 to UE#3 in FIG. 3) and, if necessary, PMIs of the relay links of the user terminals (UE#1 to UE#3 in FIG. 3), relay type information (information to identify AF or DF) and so on. The feedback control signal generating section 112 outputs the generated feedback information signals to the multiplexing section 117. Here, as correction values of the channel quality (CQIs) to correct at DeNB vary by including the relay type information in the feedback information signals, it is possible to obtain optimal correction values at DeNB by giving the relay type information as feedback information.

The multiplexing section 117 combines the phase-shifted and/or amplitude-shifted transfer data, the feedback information signals generated by the feedback information signal generating section 112 and sounding reference signals (SRSs) to measure channel quality (CQIs) for the backhaul link, and generates transmission signals for the respective antennas 101a and 101b.

The transmission signals combined in the multiplexing section 117 are subjected to discrete Fourier transform at DFT (discrete Fourier transform) sections 118a and 118b and converted from time-series signals into frequency-domain signals. The converted signals are output to IFFT (inverse fast Fourier transform) sections 119a and 119b. The IFFT sections 119a and 119b perform inverse fast Fourier transform on the signals having been subjected to DFT, and the signals are converted from frequency-domain signals to time-series signals. The converted signals are output to CP adding sections 120a and 120b. The CP adding sections 120a and 120b add CPs to the converted signals. The CP-added signals are output to RF transmission circuits 121a and 121b.

The CP-added signals are subjected to frequency conversion into radio-frequency signals at the RF transmission circuits 121a and 121b. Then, the frequency-converted signals are output to the antennas 101a and 101b via the duplexers 102a and 102, and then transmitted in the uplink from the antennas 101a and 101b to the radio base station apparatus DeNB. Note that these RF transmission circuits 121a and 121b, duplexers 102a and 102b, and antennas 101a and 101b make up a transmitting section to transmit feedback information signals including measurement results of channel quality of the relay links to the radio base station apparatus DeNB.

As described up to this point, in the radio relay station apparatus RN according to the present embodiment, the CQI measuring sections 111*a* and 111*b* measure channel quality (CQIs) of the relay links with use of SRSs from the respective user terminals. This CQI information (CQI measurement results) is output to the feedback information signal generating section 112 and incorporated into the feedback information signals in the feedback information signal generating section 112. Then, the feedback information signals are transmitted via the backhaul link to the radio base station apparatus DeNB. These feedback information signals may include PMIs of the relay links of the respective user terminals and relay type information.

Figure 8:
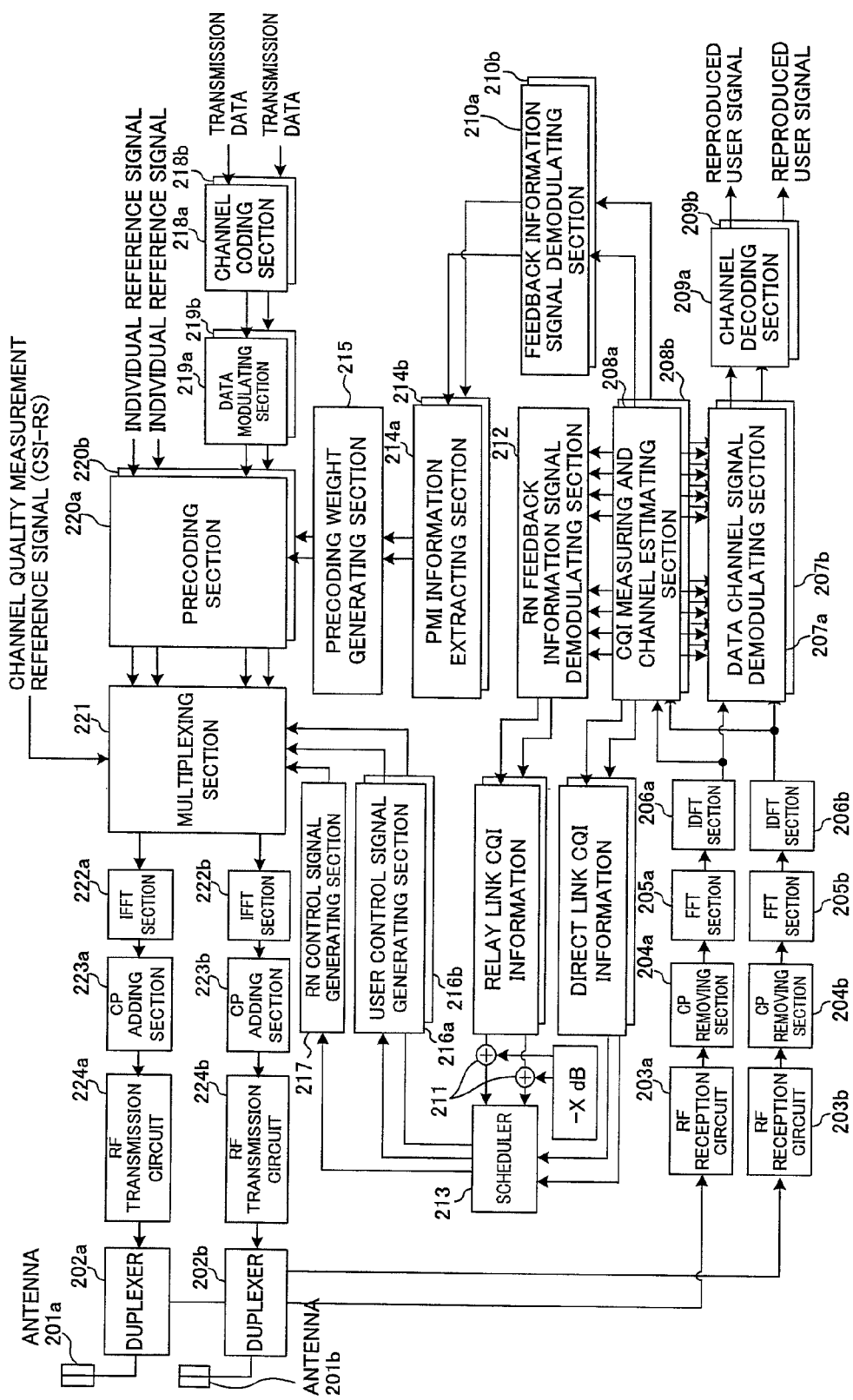
FIG. 8 is a block diagram illustrating a configuration of a radio base station apparatus according to the present embodiment.

FIG. 8 is a block diagram illustrating a configuration of the radio base station apparatus DeNB according to the present embodiment. Note that illustration in FIG. 8 is simplified for explanation and needless to say, the radio base station apparatus is configured to have standard parts.

In the radio base station apparatus DeNB illustrated in FIG. 8, transmission signals transmitted from the user terminals UE#1 to UE#3 and transmission signals transmitted from the relay node RN via the backhaul link are received by antennas 201*a* and 201*b*, electrically separated into transmission paths and reception paths at duplexers 202*a* and 202*b*, and then, output to RF reception circuits 203*a* and 203*b*. Then, the RF reception circuits 203*a* and 203*b* perform frequency conversion and convert radio frequency signals to baseband signals, which are then output to CP removing sections 204*a* and 204*b*. Note that the antennas 201*a* and 201*b*, the duplexers 202*a* and 202*b*, and the RF reception circuits 203*a* and 203*b* make up a receiving section to receive SRSs from the user terminals and also receive feedback information including measurement results of channel quality of the relay links from the relay node RN.

The CP removing sections 204*a* and 204*b* remove CPs from the frequency-converted signals, and the CP-removed signals are output to FFT sections 205*a* and 205*b*. The FFT sections 205*a* and 205*b* perform Fourier transform on the CP-removed signals, and convert time-series signals into frequency-domain signals. The converted signals are output to IDFT sections 206*a* and 206*b*. The IDFT sections 206*a* and 206*b* perform inverse discrete Fourier transform on the frequency domain signals and convert the frequency-domain signals into time-series signals. The converted signals are output to CQI measuring and channel estimating sections 208*a* and 208*b*, data channel signal demodulating sections 207*a* and 207*b*.

The CQI measuring and channel estimating sections 208*a* and 208*b* estimate channel states from reference signals for channel quality measurement (SRSs) and demodulation reference signals (DM-RSs) included in reception signals output from the IDFT sections 206*a* and 206*b*, and transmit the channel states estimated with use of the DM-RSs to data channel signal demodulating sections 207*a* and 207*b*. The data channel signal demodulating sections 207*a* and 207*b* demodulate data channel signals based on the received channel states. The demodulated data channel signals are channel-decoded in channel decoding sections 209*a* and 209*b* and reproduced into user signals.

The CQI measuring and channel estimating sections 208*a* and 208*b* measure channel quality (CQIs) with use of the channel states estimated with use of SRSs from the user terminals. In other words, the CQI measuring and channel estimating sections 208*a* and 208*b* measure CQIs (CQI$_{DeNB1}$ to CQI$_{DeNB3}$) with use of the SRSs from the user terminals (UE#1 to UE#3 in FIG. 3) in the cell. These CQI measurement results are used in allocation of radio resources as direct link CQI information. Note that the CQI measuring and channel estimating sections 208*a* and 208*b* measure a CQI of the backhaul link in the same manner.

The CQI measuring and channel estimating sections 208*a* and 208*b* communicate the estimated channel states also to feedback information signal demodulating sections 210*a* and 210*b* and an RN feedback information signal demodulating section 212. In the feedback information signal demodulating sections 210*a* and 210*b*, the communicated channel states are used as a basis to demodulate feedback information signals from the user terminals (PMI information of the direct links of the user terminals, rank information, and so on). The feedback information signal demodulating sections 210*a* and 210*b* output demodulated feedback information signals to PMI information extracting sections 214*a* and 214*b*.

The RN feedback information signal demodulating section 212 uses the received channel states as a basis to demodulate feedback information signals (CQIs and PMIs measured at relay node RN and relay type information) transmitted from the relay node RN via the backhaul link. The demodulated RN feedback information signals are used in allocation of radio resources as relay link CQI information. Note that the RN feedback information signals may be managed for the direct link and relay link, separately, or as associated with user terminals as illustrated in FIGS. 5 and 6.

The PMI information extracting sections 214*a* and 214*b* extract PMI information from the demodulated feedback information signals and output the extracted PMI information to a precoding weight generating section 215. The precoding weight generating section 215 generates precoding weights using the PMI information extracted from the feedback information signals. The precoding weight generating section 215 outputs the generated precoding weights to precoding sections 220*a* and 220*b*.

The precoding sections 220*a* and 220*b* use the precoding weights corresponding to the PMI information as a basis to perform phase-shift and/or amplitude-shift on transmission data for the antennas 201*a* and 201*b*, separately. The transmission data phase-shifted and/or amplitude-shifted by the precoding sections 220*a* and 220*b* are output to a multiplexing section 221. In the precoding sections 220*a* and 220*b*, transmission data is multiplexed with individual reference signals prior to precoding. These individual reference signals are DM-RSs used in demodulation by the user terminals UEs.

Note that the transmission data is signals addressed to user terminals. The transmission data is channel-coded by channel coding sections 218*a* and 218*b* and output to data modulating sections 219*a* and 219*b*. The data modulating sections 219*a* and 219*b* data-modulate the channel-coded transfer data. The data modulating sections 219*a* and 219*b* output data-modulated transfer data to the precoding sections 220*a* and 220*b*.

CQI information (relay link CQI information) included in RN feedback information signals is subjected to correction processing. In other words, subtracting sections 211 subtract a predetermined correction value (X) from the relay link CQI information. Specifically, as illustrated in the upper table in FIG. 5, correction is made to the measurement results of the relay link CQIs.

A scheduler 213 allocates radio resources to any user terminal based on the above-mentioned subtraction results and direct-link CQI information. For example, the scheduler allocates radio resources to a user terminal of highest channel quality based on the direct-link CQI information and subtraction results. Specifically, the CQI values corrected in the upper table in FIG. 5 and the CQI values in the lower table are used as a basis to select a user terminal of highest channel quality (UE#2 (direct link)) and the radio resources are allocated to this user terminal. Note that the radio resources to allocate may be given per resource block or in any other units.

For example, a correction value can be obtained from the formula (1).

$$X(\text{dB}) = 10 \log_{10}\left\{1 + \frac{\log_2\left(1 + 10^{CQI_{RN_1}/10}\right)}{\log_2\left(1 + 10^{CQI_{Back_1}/10}\right)}\right\} \quad \text{(FORMULA 1)}$$

$CQI_{RN1}$ is SINR (dB) between a mobile terminal apparatus and a relay node and $CQI_{Back1}$ is SINR (dB) between a relay node and a radio base station apparatus.

Note that this method for determining a correction value is by no means limiting, and any other method may be employed as far as a correction value is determined in consideration of radio resources used extra by the relay link.

User control signal generating sections 216a and 216b generate PDCCH (Physical Downlink Control Channel) signals for the respective user terminals. Note that the PDCCH signals include, for example, resource allocation information, MCS information, information related to retransmission (RV: Redundancy Version), NDI (New Data Indicator), information of transmission power control, precoding information (PMI information), rank information (RI) and so on. The user control signal generating sections 216a and 216b output the generated PDCCH signals to the multiplexing section 221.

An RN control signal generating section 217 generates PDCCH signals for the relay node. Note that the PDCCH signals include, for example, resource allocation information, MCS information, information related to retransmission (RV: Redundancy Version), NDI (New Data Indicator), information of transmission power control, precoding information (PMI information), rank information (RI) and so on. The RN control signal generating section 217 outputs the generated PDCCH signals to the multiplexing section 221.

In the scheduler 213, when a user terminal to allocate radio resources is determined by link, a MCS is determined in accordance with the user terminal. This determined MCS is transmitted in the PDCCH to the relay node RN or user terminal UE. For example, if the user terminal to allocate the radio resources is a direct-link user terminal, information of MCS suitable for the user terminal is transmitted to the user terminal UE as a PDCCH signal for the user. On the other hand, if the user terminal to allocate the radio resources is a relay-link user terminal, information of a MCS suitable for the user terminal is transmitted to the relay node RN as a PDCCH signal for RN.

And, where the user terminal has the MIMO precoding function, if the user terminal to allocate the radio resources is determined by link in the scheduler 213, a PMI is determined in accordance with the user terminal. This determined PMI is transmitted to the relay node RN or the user terminal UE in the PDCCH. For example, if the user terminal to allocate the radio resources is a direct-link user terminal, information of a PMI suitable for the user terminal is transmitted to the user terminal UE in a PDCCH signal for the user. On the other hand, if the user terminal to allocate the radio resources is a relay-link user terminal, information of a PMI suitable for the user terminal is transmitted to the relay node RN as a PDCCH signal for RN.

The multiplexing section 221 combines the phase-shifted and/or amplitude-shifted transmission data, RN control signals generated by the RN control signal generating section 217, user control signals generated by the user control signal generating sections 216a and 216b, and channel quality measurement reference signals (CSI-RS: Channel State Information-Reference Signal) to measure downlink channel quality in user terminals UEs, and generates transmission signals for the respective antennas 201a and 201b.

The transmission signals combined by the multiplexing section 221 are output to IFFT sections 222a and 222b. In the IFFT sections 222a and 222b, the transmission signals are subjected to inverse fast Fourier transform and converted from frequency-domain signals to time-series signals. The converted signals are output to CP adding sections 223a and 223b. The CP adding sections 223a and 223b add CPs to the converted signals. The CP-added signals are output to RF transmission circuits 224a and 224b.

In the RF transmission circuits 224a and 224b, the CP added signals are subjected to frequency conversion and converted into radio frequency signals. The frequency-converted signals are output via the duplexers 202a and 202b to the antennas 201a and 201b, and transmitted from the antennas 201a and 201b to the relay node RN or the user terminals UE in the downlink. Note that these RF transmission circuits 224a and 224b, duplexers 202a and 202b, antennas 201a and 201b make up a transmitting section to transmit signals to the relay node RN or the user terminals UE.

In the radio base station apparatus DeNB according to the present embodiment, the CQI measuring and channel estimating sections 208a and 208b measure channel quality (CQIs) of the direct links using SRSs from the respective user terminals. The subtracting sections 211 subtract a correction value from the channel quality (CQI) of the relay link included in the feedback information from the relay node RN. In the scheduler 213, the subtraction results (corrected relay-link CQI) and the direct-link CQI are used as a basis to allocate radio resources to any user terminal.

The embodiments of the present invention have been described up to this point. However, a person of ordinary skill in the art would understand that the present invention is not limited to the embodiments described here. For example, in the above-described embodiments, the number of users and the number of processing units in an apparatus are by no means limiting and may be modified as appropriate in accordance with the configuration of the apparatus. Further, the present invention may be embodied in various modified or altered forms without departing from the scope and spirit of the present invention defined by claims. Accordingly, this description has been given for illustrative purposes only and is by no means intended to limit the present invention.

The disclosure of Japanese Patent Application No. 2010-275630, filed on Dec. 10, 2010, including the specification, drawings, and abstract, is incorporated herein by reference in its entirety.

The invention claimed is:

1. A radio relay station apparatus comprising:
a receiving section configured to receive a sounding reference signal from a mobile terminal apparatus;
a channel quality measuring section configured to measure channel quality of a relay link with use of the sounding reference signal; and
a transmitting section configured to transmit feedback information including a measurement result of the channel quality of the relay link to a radio base station apparatus via a backhaul link;
wherein the measurement result of the channel quality of the relay link is corrected by subtracting a correction value X from the measurement result of the channel quality of the relay link in the radio base station apparatus, and the radio relay station apparatus communicates with the mobile terminal apparatus using radio resources that are allocated, by the radio base station apparatus, based on measurement results of channel quality of direct links and a subtraction result in such a manner as to suppress allocation of the radio resources to the relay link using more radio resources than the direct links.

2. The radio relay station apparatus of claim 1, wherein the feedback information includes a precoding matrix indicator of the relay link.

3. The radio relay station apparatus of claim 2, wherein the feedback information includes information of a relay type.

4. The radio relay station apparatus of claim 1, wherein the feedback information includes information of a relay type.

5. A radio base station apparatus comprising:
a receiving section configured to receive sounding reference signals from mobile terminal apparatuses and to receive feedback information including measurement results of channel quality of relay links from a radio relay station apparatus;
a channel quality measuring section configured to measure channel quality of direct links with use of the sounding reference signals;
a subtracting section configured to subtract a correction value X from each of the measurement results; and
an allocating section configured to allocate radio resources to a mobile terminal apparatus based on measurement results of the channel quality of the direct links and subtraction results;
wherein the subtracting section corrects the channel quality of the relay links, using more radio resources than the direct links, to decrease by the correction value X to suppress the allocation of the radio resources.

6. The radio base station apparatus of claim 5, wherein the allocating section allocates the radio resources to the mobile terminal apparatus which has highest channel quality in the measurement results of the channel quality of the direct links and the subtraction results.

7. The radio base station apparatus of claim 6, wherein the correction value X is obtained by a following formula (1):

$$X(\text{dB}) = 10 \log_{10}\left\{1 + \frac{\log_2\left(1 + 10^{CQI_{RN_1}/10}\right)}{\log_2\left(1 + 10^{CQI_{Back_1}/10}\right)}\right\} \quad \text{FORMULA (1)}$$

where $CQI_{RN_1}$ is SINR(dB) (Signal-To-Interference-Plus-Noise Ratio) between a mobile terminal apparatus and a relay node, and $CQI_{Back_1}$ is SINR(dB) between the relay node and the radio base station apparatus.

8. The radio base station apparatus of claim 6, wherein the correction value X is an individual value of each of the mobile terminal apparatuses, using any parameter out of a measurement result of channel quality of an access link, a measurement result of channel quality of a backhaul link and a relay type.

9. The radio base station apparatus of claim 5, wherein the correction value X is an individual value of each of the mobile terminal apparatuses, using any parameter out of a measurement result of channel quality of an access link, a measurement result of channel quality of a backhaul link and a relay type.

10. The radio base station apparatus of claim 5, wherein the correction value X is obtained by a following formula (1):

$$X(\text{dB}) = 10 \log_{10}\left\{1 + \frac{\log_2\left(1 + 10^{CQI_{RN_1}/10}\right)}{\log_2\left(1 + 10^{CQI_{Back_1}/10}\right)}\right\} \quad \text{FORMULA (1)}$$

where $CQI_{RN_1}$ is SINR(dB) (Signal-To-Interference-Plus-Noise Ratio) between a mobile terminal apparatus and a relay node, and $CQI_{Back_1}$ is SINR(dB) between the relay node and the radio base station apparatus.

11. The radio base station apparatus of claim 5, wherein a modulation and coding scheme is determined in accordance with the mobile terminal apparatus to which the radio resources are allocated.

12. The radio base station apparatus of claim 5, wherein, when the mobile terminal apparatuses have MIMO precoding function, a precoding matrix indicator is determined in accordance with the mobile terminal apparatus to which the radio resources are allocated.

13. A radio communication method comprising the steps of:
in a radio relay station apparatus,
measuring channel quality of relay links with use of sounding reference signals from mobile terminal apparatuses; and
transmitting feedback information including measurement results of the channel quality of the relay links, to a radio base station apparatus via a backhaul link; and
in the radio base station apparatus,
measuring channel quality of direct links with use of sounding reference signals from the mobile terminal apparatuses;
subtracting a correction value X from the measurement results of the channel quality from the radio relay station apparatus; and
allocating radio resources to a mobile terminal apparatus based on measurement results of the channel quality of the direct links and subtraction results;
wherein the radio base station apparatus corrects the channel quality of the relay link, using more radio resources than the direct link, to decrease by the correction value X to suppress the allocation of the radio resources.

14. The radio communication method of claim 13, wherein the feedback information includes precoding matrix indicators of the relay links.

15. The radio communication method of claim 14, wherein the feedback information includes information of a relay type.

16. The radio communication method of claim 13, wherein the feedback information includes information of a relay type.

17. The radio communication method of claim 13, wherein the radio resources are allocated to the mobile terminal apparatus which has highest channel quality in the measurement results of the channel quality of the direct links and the subtraction results.

18. The radio communication method of claim 13, wherein the correction value X is an individual value of each of the mobile terminal apparatuses, using any parameter out of a measurement result of channel quality of an access link, a measurement result of channel quality of a backhaul link and a relay type.

19. The radio communication method of claim 13, wherein the correction value X is obtained by a following formula (1):

$$X(\text{dB}) = 10 \log_{10}\left\{1 + \frac{\log_2\left(1 + 10^{CQI_{RN_1}/10}\right)}{\log_2\left(1 + 10^{CQI_{Back_1}/10}\right)}\right\} \quad \text{FORMULA (1)}$$

where $CQI_{RN_1}$ is SINR(dB) (Signal-To-Interference-Plus-Noise Ratio) between a mobile terminal apparatus and a relay node, and $CQI_{Back_1}$ is SINR(dB) between the relay node and the radio base station apparatus.

20. The radio communication method of claim 13, wherein a modulation and coding scheme is determined in accordance with the mobile terminal apparatus to which the radio resources are allocated.

21. The radio communication method of claim 13, wherein, when the mobile terminal apparatuses have MIMO precoding function, a precoding matrix indicator is determined in accordance with the mobile terminal apparatus to which the radio resources are allocated.

* * * * *